United States Patent [19]

Oike

[11] Patent Number: 4,554,785
[45] Date of Patent: Nov. 26, 1985

[54] ENGINE EXHAUST APPARATUS

[75] Inventor: Ikuo Oike, Niiza, Japan

[73] Assignee: Honda Giken Kogyo Kabushiki Kaisha, Tokyo, Japan

[21] Appl. No.: 563,426

[22] Filed: Dec. 20, 1983

[30] Foreign Application Priority Data

Dec. 24, 1982 [JP] Japan .................................. 57-225925
Dec. 24, 1982 [JP] Japan ............................ 57-195158[U]

[51] Int. Cl.⁴ ............................................. F02B 27/02
[52] U.S. Cl. ......................................... 60/314; 60/312
[58] Field of Search .................................. 60/312, 314

[56] References Cited

U.S. PATENT DOCUMENTS 3,254,484  6/1966  Kopper .................................. 60/312
3,367,311  2/1968  Tenney .................................. 60/314
4,336,864  6/1982  Asaka .................................... 181/255

FOREIGN PATENT DOCUMENTS 1601350  11/1970  Fed. Rep. of Germany ........ 60/312
55-132321  9/1980  Japan ..................................... 60/214
55-112823  9/1980  Japan ..................................... 60/312

Primary Examiner—Douglas Hart
Attorney, Agent, or Firm—Pollock, Vande Sande & Priddy

[57] ABSTRACT

Exhaust apparatus for a vehicle engine, having a connecting line which connects a sub-chamber to an engine exhaust line and which is provided with an opening and closing valve connected to a power source responsive to the number of engine revolutions per minute, i.e. speed, and causing the valve to open and close in dependency of the number of such revolutions. The power source is connected to the shaft mounting the valve by elements inserted through the outer walls of an engine cylinder, the exhaust line and a crank case.

2 Claims, 3 Drawing Figures

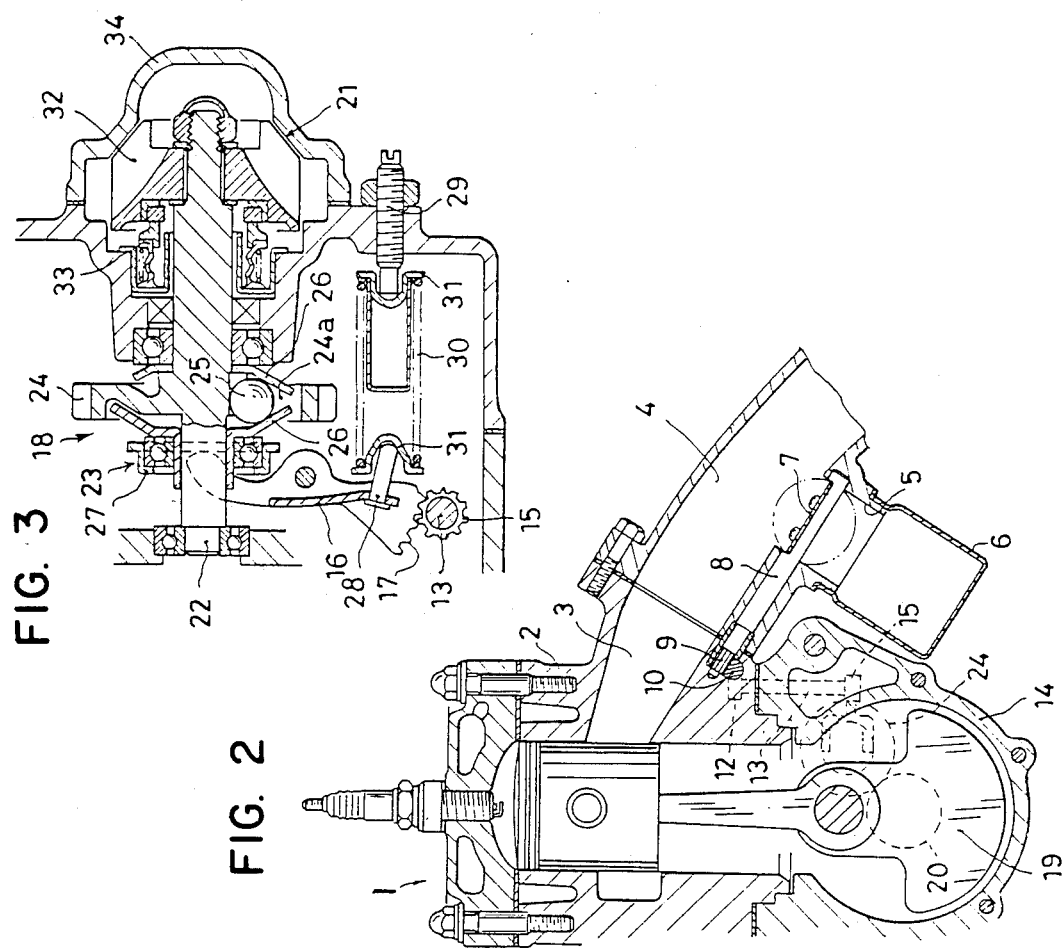
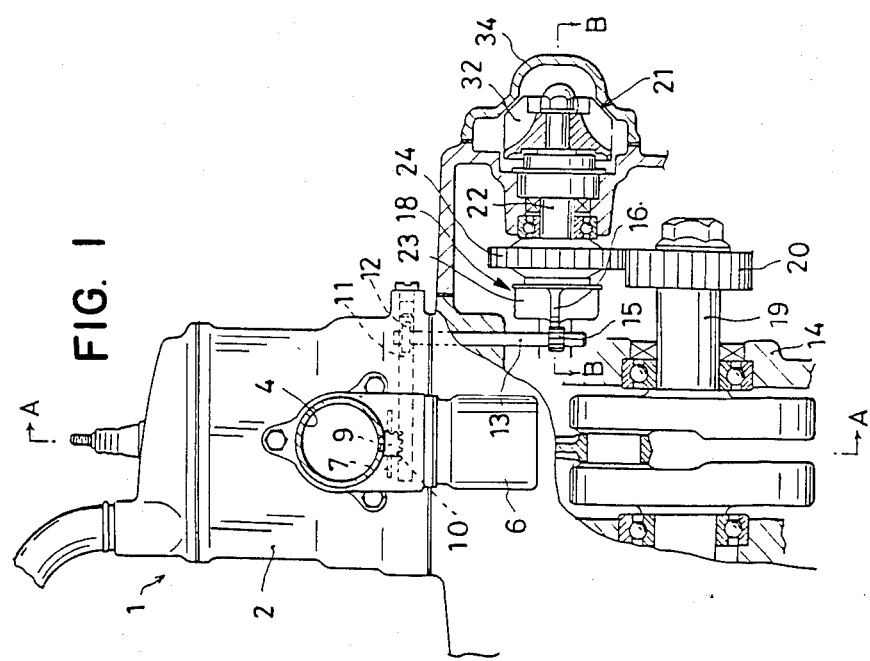

ENGINE EXHAUST APPARATUS

SUMMARY OF THE INVENTION

The present invention relates to an engine exhaust apparatus which is made to open and close in correspondence with the number of engine revolutions per minute, i.e. speed, by means of an opening and closing valve located in the sub-chamber connecting line, which connects the said sub-chamber to the engine exhaust line of a vehicle, and is located part way along the said exhaust line.

BACKGROUND OF THE INVENTION

In this type of device, the location of the motive power source which causes the opening and closing valve to open and close has been a source of problems, and has in particular made it difficult to downsize the engine. Moreover, since the opening and closing valve and the motive power source are located at positions remote from each other, and since the direction of their movements is not uniform, when they are connected by link mechanisms or cable type arrangements, their drive side and driven side shaft ends project from the crank case, the cylinder, the exhaust line and the like, and as a result, some sort of covering is required to protect the exposed parts against stones or mud, and to provide oil seals and the like.

OBJECT OF THE INVENTION

The present invention is designed to overcome these problems by providing for the motive power source and the shaft for rotating the opening and closing valve by elements supported by being inserted through the outer walls of the engine cylinder, exhaust line and crank case.

BRIEF INTRODUCTION TO THE DRAWINGS

In order that the invention may be more clearly understood, reference will not be made to the accompanying drawings, wherein an embodiment of the invention is shown for purposes of illustration, and wherein:

FIG. 1 shows a partial side view of the apparatus according to the invention.

FIG. 2 shows a cross-section view along the line A—A in FIG. 1.

FIG. 3 shows a cross-section view along line B—B in FIG. 1.

DESCRIPTION OF A PREFERRED EMBODIMENT

The engine exhaust apparatus has a sub-chamber 6 which is connected by a connecting line 5 to a vehicle engine exhaust line 4, the connecting line being located part way along the said exhaust line. An opening and closing valve 7 located on the connecting line is connected to a motive power source 18 which responds to the number of engine revolutions, causing valve 7 to open and close in correspondence with the number of such revolutions. The power source comprises a centrifugal governor device 23 which is located on the shaft 22 of water pump 21, which is linked to crank shaft 19 by drive gear 20.

As shown in the drawings, exhaust line 4 is connected to exhaust port 3 of engine cylinder 2. Opening and closing valve 7 has a rotating shaft 8 parallel to exhaust line 4 and extending into the outer wall of the latter, its outer end being fitted through the outer wall of exhaust port 3, and its shaft end being formed with a pinion 9 which engages with a rack 10 in the outer wall of exhaust port 3, and goes directly across the latter. At the other end of rack 10, a second rack 11 crosses rack 10 directly, and a pinion shaft 13 which has a second pinion 12 engaged with the said second rack protrudes toward the interior of crank case 14 through the outer wall of the latter. A third pinion 15 at the end of this protruding end is engaged with a sector gear 17 placed on one end of a rocking lever 16 which is supported axially in crank case 14. The other end of lever 16 is connected with motive power source 18. Governor device 23 comprises a pair of sloping plates 26 on pump shaft 22 for retaining and supporting a ball 25 in a long horseshoe shaped hole 24a formed in the boss area of the driven gear 24 of pump shaft 22. One end of the sloping plates is connected to the other end of rocking lever 16 by means of a release 27. In addition, lever 16 is so arranged that its rocking position is regulated externally, with lever 16 having a pin 28 protruding through one of its ends, said pin being held in contact by means of retainers 31, loaded by a spring 30, the pressure of which is regulated by a regulating screw 29 located in crank case 14. Element 32 is the impeller of water pump 21, 33 is its mechanical seal, and 34 is a pump cover.

The device operates as follows: Pinion shaft 13 which is connected by means of rocking lever 16 to motive power source 18 causes the second rack 11 to be movable. The latter and a pair of racks 10 are engaged along with a rotary movement shaft 8 which is caused to rotate, and opening and closing valve 7 opens and closes connecting line 5. Since motive power source 18 involves a centrifugal governor device which is located on shaft 22 of pump 21 which is linked to crank shaft 19, the placement of the motive power source is easily accomplished, and its is also possible to downsize the governor device, and thus to satisfy the requirement that the engine be made light and of a limited size. In addition, the connecting elements are not exposed to mud and flying stones, so that durability is enhanced without the provision of a protective cover.

What is claimed is:

1. Exhaust apparatus for a vehicle engine, comprising a sub-chamber connected by a connecting line to an engine exhaust line, said connecting line being located part way along said exhaust line and having thereon an opening and closing valve connected to a motive power source which is responsive to the number of revolutions of said engine and which causes said valve to open and close in correspondence with the number of said revolutions, wherein said motive power source is connected to a shaft mounting said valve by elements inserted through the outer walls of a cylinder of said engine, said exhaust line, and a crank case.

2. Exhaust apparatus according to claim 1, wherein said motive power source comprises a centrifugal governor device on the shaft of a water pump linked to a crank shaft.

* * * * *